United States Patent
Ahn et al.

(10) Patent No.: US 8,245,299 B2
(45) Date of Patent: Aug. 14, 2012

(54) METHOD OF AND APPARATUS FOR MONITORING CODE TO DETECT INTRUSION CODE

(75) Inventors: Tae-Jin Ahn, Yongin-si (KR); Yun-Sun Nam, Yongin-si (KR); Jung-Hwan Song, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1080 days.

(21) Appl. No.: 12/159,716

(22) PCT Filed: Nov. 27, 2006

(86) PCT No.: PCT/KR2006/005000
§ 371 (c)(1),
(2), (4) Date: Jun. 30, 2008

(87) PCT Pub. No.: WO2007/078055
PCT Pub. Date: Jul. 12, 2007

(65) Prior Publication Data
US 2009/0049551 A1    Feb. 19, 2009

(30) Foreign Application Priority Data
Dec. 30, 2005   (KR) .................. 10-2005-0135839

(51) Int. Cl.
*G06F 21/00* (2006.01)
(52) U.S. Cl. ........................................... 726/23
(58) Field of Classification Search .............. 726/22–25
See application file for complete search history.

(56) References Cited

U.S. PATENT DOCUMENTS

| | | | |
|---|---|---|---|
| 6,735,700 B1 | 5/2004 | Flint et al. | |
| 7,779,062 B2 * | 8/2010 | Waterson | 709/200 |
| 2002/0186362 A1 * | 12/2002 | Shirai et al. | 356/5.05 |
| 2003/0237000 A1 * | 12/2003 | Denton et al. | 713/201 |
| 2004/0049380 A1 * | 3/2004 | Ehara et al. | 704/219 |
| 2004/0072296 A1 * | 4/2004 | Rine et al. | 435/69.1 |
| 2004/0172551 A1 | 9/2004 | Fielding et al. | |
| 2005/0028002 A1 | 2/2005 | Christodorescu et al. | |

FOREIGN PATENT DOCUMENTS

JP   09-502550 A   3/1997
(Continued)

OTHER PUBLICATIONS

Japanese Office Action issued on Jun. 28, 2011, in corresponding Japanese Patent Application No. 2008-548375 (4 pages).

(Continued)

*Primary Examiner* — Gilberto Barron, Jr.
*Assistant Examiner* — David Le
(74) *Attorney, Agent, or Firm* — NSIP Law (57) ABSTRACT

A method and apparatus for monitoring a code to detect intrusion code is used to monitor target code to determine whether the target code is a resident code in a system or an intrusion code into the system. A first code pattern is extracted from the target code and a second code pattern is loaded from a storage unit, and a distance between the first code pattern and the second code pattern is calculated. The calculated distance is compared to a threshold to determine whether the target code is an intrusion code.

28 Claims, 9 Drawing Sheets

FOREIGN PATENT DOCUMENTS

| | | |
|---|---|---|
| KR | 10-2000-0039014 A | 7/2000 |
| KR | 10-2002-0063314 A | 8/2002 |
| KR | 10-2004-0080844 A | 9/2004 |
| KR | 10-2004-0098902 A | 11/2004 |
| KR | 10-2004-0099864 A | 12/2004 |
| KR | 10-2005-0070306 A | 1/2005 |

OTHER PUBLICATIONS

Madhusudan, Bharath, et al., "Design of a system for Real-Time worm detection" IN: Proceedings of 2004 12th Annual IEEE Symposium on High Performance Interconnects, Aug. 25-27, 2004, pp. 77-83, IEEE.

* cited by examiner

```
GGTAATACCCCCCAGCAAAAACGCCGGCGATCTTCATAAGCACATCATAATTAGGTGGCACAAAA
CGACCCGCTGGACTAGTCGAACAGTAGGCGGCGCCGATCAAGAGTTGAAGACTTCGCGAATGGGC
GAAATACCACATAATCGCCGATGTTGGCTTGATGACTCTGTAAGTCAGGTGAGAGTCAGGTGAGA
GTCAGGTGAGATCAATCTTAGAATCAGGTGAGATTCATCCTAGAATCAGGTGAGAGCCTCCAAGA
TCCAGGTGAGAGCCTCTCAGAGACAGGTGAGAGTCAGGAGAGACTGGTGAGAATTCTCGGTGACT
GAGGTGAGAGCCTCGAAGAAAAGGTGAGAGCAGCGCCAGACTCAGGTGAGAGATTGGCAGAGGG
TCAGGTGAGAAATTTAACATACCAGCTTAAAAAGCCGAAAAACTAAAAAAAAAAAAAAAAGAAA
AAAAAAAAAGGCCGACTAAGAAGACAAAACGCATCTTGAGCATCGAATCAAAAAAAAAAGGCGA
CATGTAGATCTAGAAAAAAAAAAAAAAAAAAGCATGTAGATCTAGAATGAAAAAAAAAAAAACA
TAGGTAGGACTTGATGCCTTTAAAAATAAAATAAAAAAGCGACCACGACCAGAAGACAAGAAAA
GAAAAGTTCGATACAGGATGAACCTAGAAACTAGAACGAGTAGCTCAAAATAATAATAATAATA
ATAATAATAATAATAATAATAATAATGTTCGATACAGGAGGTCATAATAATCTGTTAGGTCCAAC
CAAATAACGAGTAGCTGAAAAATAATCTAAAACTAGAATGGTCGAACAATAATAATAATAATTAG
TTAGAACAAAATAATAATAATAATAATAATAATAATAATAGCACTAGAACAAAATAATAATAATA
ATAATAATAATAATAATGTTCGAATCATAGTTAGGTGAAACTTAAAATTCAGCTGAAACGAGCAA
CCGAGTAAAGGGGGGAAATCATTCCCCCCCCCCCAGGCCCGGGTGAGCAACTGAGTAAACCCT
TATTGTAGAAAATGGGCAGGGAACTGAGTAAGAGCGCTGAAAAATAATAATAATCAAACGATTTA
TTCAACAATAAGGAACTCAACAATAGGATCCCGCAAATAATTCAAAATAATAATAATAATAATGA
AAAATAATAATAATAATAATAATAATAATAATAATAATAATCAAAATAATAATAATAATAATAAT
AATAATAATAATAATAATAATCGATAAAAGGGAATCCCTTAATGTAGAACAAAATAATAATC
GATAAAAGGGAATCCCTTAATGTAGAACAAAATAATAATGGGCCCAGGCACGGAAATGTAGAATA
TGTGATTTATCGAATAATATGTTCTTCGATACAATAGGGCTTGAATCATAAAGGCAGCCGTCAGC
CAAGCTAATAATATCGACCAAGGTCACCGCTACAGGTGAGAATCAGCCAAGGTAATAATATCGAC
CAAGGTTCCGCTACAGTGAGAACTAGAATAGAGAATAGAGCTAGAATTAAAATTCAAAGGACCGT
TGAACCCTTACAGTAGAACAGAGCTAGAACGAACAATACTAGTAAAGCGAGTACCTGCTATGTGA
TCAAATAAAGAAAAATAATAATAATAATGTTCGATACAGGAGGTCATAATAATCTGTTAGGTCTG
CGCAAATAACGAGTAGCTGAAAAATAATGGGCCCAGGCACGAAATGTAGAATATGTGATTTATGT
TCGATACTGAATCATATCAGCAAAGCTAATAATAAAGGGTCCGTCAGCAAAGGTAATAATAAAGG
CCCGCGAGCACTAATAATAACCCCCCCCCCAGGGCCGCGCGAACAATAGCTATGTGATCAAAT
AAACAAAATAATAATAATCGAATAATAGTTTTAAAACGATACATCACGAGTAATGAATAGGTGGC
GAGCAAGGGAGCTGAAAAATAATAATAATAATAATAATAATAATAATAATAATAATCGAATA
```

FIG. 7

NTPQQKRRRSSZAHHNZVAQNDPLDZSNSRRRRSRVEDFANGRNTTZSPMLAZZLCKSGESQVRVRZDQSZ
NQVRFILESGESLQDPGESLSETGESQERLVRILGDZGESLEEKGESSARLRZEIGRGSGEKFNIPAZKAE
KLKKKKKRKKKKGRLRRQNASZASNQKKKATCRSRKKKKKKHVDLEZKKKKTZVGLDAFKNKIKKRPRPED
KKKKVRYRMNLETRTSSSKZZZZZZZZZZZZZZCSIQEVIIICZVQPNNEZLKNNLKLEWSNNNNNNZLEQN
NNNNNNNNNSTRTKZZZZZZZZZZCSNHSZVKLKIQLKRATEZRGGNHSPPPQARVSNZVNPYCRKWAGNZV
RALKNNNNQTIYSTIRNSTIGSRKZFKIIIIIMKNNNNNNNNNNNNNNQNNNNNNNNNNNNNNNNRZKGIPZC
RTKZZSIKGNPLMZNKIIMGPGTEMZNMZFIEZYVLRYNRAZIIKAAVSQANNIDQGHRYRZESAKVIIST
KVPLQZELEZRIELELKFKGPLNPYSRTELERTILVKRVPAMZSNKEKZZZZCSIQEVIIICZVCANNEZL
KNNGPRHEMZNMZFMFDTESYQQSZZZRVRQQRZZZRPASTNNNPPPPGPREQZLCDQINKIIIIEZZFZN
DTSRVMNRWRARELKNNNNNNNNNNNNNNNRIIVRYNRPAGGRARSZKIIIIEZYMFDTLIQQRGLRELYLR
IVEQKGGGYPLKZNELNDHSRRSPFTYLEZKIPFLLVKNNNNNNNNNNNNRIIVRYLRSKZKIEZCEZKGGK
SPSSKRGEDIPFELKIPYSRTCZKIIIIIIIEZZFDTGIGRAKYPLKZNELKIPYSRSZKIIMFDTGRRSL
VKAQNNNNNNNNNNNVRYGRRSQAKFTSKGNPLPZNZZRLKIIIIMFDTFEPYQZRIGTZVLVSKGZALRPS
PAEKZZQRTKZZZZZZZZZZCSIQGFALSVENRKSNRARDRALKIIIIIIIIIIIIMFDTKPSSRPPPPEQG
VANNTSKNYPLPZKLKNNNNNGPRNEMZNMZFIEZYVLKRYLRINNRGZREZYLIIIKIRRZWRTITGESI
IEZVPMIGZSNKREFNNTGRREZZGNRARSSPPSTIASNANNNPPPPGTRKSSNNNVIKZRNKALZSTIRC
TRIIPNNNZNSTISGEZTGESTIYRGRZZAISNKREFNNKETRTIGYRARAPPPQQYZZCZZZPPPPRWRQ
KLEQZCDQIKKQSIGQSYLPKRSIKASDKAFDELCEQIGDPPPKSSNNNVIKZRNKAFRGGRARITPPQKL
EQZCDQIKKRIIPSKZDIPPPKARTIMZSNKETNNTIEQGLPPPEQYKSYVIKZRNDKKSLIVEQNNNNNV
RYRAGVIIICZVWANNEZLKNNVRYRTGVIIICZVGQITSSZKIMGPGLEMZNMZFIEZYHFVLRYNRLZI
IEVRVSDAPRSZTIQARVSYGNNTDEGWGGPRTISNNNZKREZAKRIGRTZNDDEPGGSGEQYZANZAIZA
TZAKZAIZARZATLVSRVPASRMZSNKEKZZZZZZZZZZCSIQEVIIICZVLANNEZLKNNGPRQRNVEYVY
VRYZIISATLIIKVLVSNGNNKGHGEHZZZPPPPRZWRTIAMZSNKQNNNNNNNNGPRKRNVEYVIQTSSIL
NNKGMVNNTNNIGPGQZYEQIGPZZYRCWRRRTWSTIYRARARZWRRRIWQATFHELYEKAZKSTNNTKKL
MNQAIGSKNRPNYTZRESLKLLIWASKVWRRRVVNNSNNIGZGQQYZZYPPPPRFRRTIAMZSNNQNNNNN
NNNNNNNNNNHVRIILRCSPKHRPVRIRRRRGNVRARSPMYRPVRWRSPRHRAVRVRRQGPPPPGMLGIGH
ZRIGQLGAGHLTIGZLGAGDRPPPPGYVRERQLILRZSZAKACSZKIIIIIIIAGENKIIIIIIIIIICRG
PGIENMZFKRICSSIQESASKNZSGENRPSQITSKEKDAAIKVERSRRGRPKGZYPFRPRARALLKIRKND
LREZVEIPLIGTCEZAZNSGEATSKGTAKKAPGEETSKVPAKKGAASKATSNLKIRGRARARVLRRRQLGR
LRARZLRRRACQQZRPCQQYLIIZGCQQZVIIZAVNNSNNIGTCQZZRANRPVIIQGGAKKVGVNNIIGPE
QGLCEEGECQLZRADRARAVRRRYVSIIRANRLRVVRRRCVRVKLKINEQZRZSLKILGGPEQGPCEEGGC
EZYZKSTNYIEKAZKSWEGPSKGCAKKAVRVRLKINEZZRRSLZILGGHEQGGAKKVVRVTLKINEQYDKA
ZKSWEVTSKGLAKKAVASKDTPPSTIVIIZDIVNNKZZYRVLSTICNNIGGCQQZLIISPPPQAFANNTLL
ALCDQITKIIIIIIIIIMFDTGGZGCCZKSRNEDPIPGKTIIZNEISWVZSLNVEAQNNNNNNNNNNNNNN
ZTKVRIIIFDAEQGCCQIPANNNSIIGELSLSRTSZRSKZNKZGGRGRSPZZGYVKNHTSKGGRGKSPZZV
HVNNISKKVYACLNKRNELZSNNTVDNRPRAMPAZIKEKZZZZZZZZZZWAQEAKCRICDLCSSMLNNKAD
VNNTTKZATNNTGGCEEGVCEQYIPZZNKZRPRNRKRLMRNNKCPPLGGZDPLKZNQQYZZYPPPPRAQRT
IPAMZSNKQNNNNNNNWRAPPIIIIIIIIIIIMFDTGGDASNPSKZALKIIIIIIIIIMGPGKKCRICDSNDL
FDTFQQZGLSQQZLIIQATVNNTSKZARNNIGYSEEGASQQZYRARARPQRRREQGGRARARAQGGRLRAR

FIG. 8

| .\self\NSDTA_bin.bin | [A-Z]{4}N[A-Z]{3}[LMIV] | ZUQPNNEZL | 255 |
| --- | --- | --- | --- |
| .\self\NSDTA_bin.bin | [A-Z]{4}N[A-Z]{3}[LMIV] | SNNNNNNZL | 272 |
| .\self\NSDTA_bin.bin | [A-Z]{4}N[A-Z]{3}[LMIV] | ZZCSNHSZV | 305 |
| .\self\NSDTA_bin.bin | [A-Z]{4}N[A-Z]{3}[LMIV] | LKNNNNQTI | 357 |
| .\self\NSDTA_bin.bin | [A-Z]{4}N[A-Z]{3}[LMIV] | PLMZNKIIM | 436 |
| .\self\NSDTA_bin.bin | [A-Z]{4}N[A-Z]{3}[LMIV] | TEMZNMZFI | 448 |
| .\self\NSDTA_bin.bin | [A-Z]{4}N[A-Z]{3}[LMIV] | VLRVNRAZI | 460 |
| .\self\NSDTA_bin.bin | [A-Z]{4}N[A-Z]{3}[LMIV] | ZVCANNEZL | 559 |
| .\self\NSDTA_bin.bin | [A-Z]{4}N[A-Z]{3}[LMIV] | HEMZNMZFM | 574 |
| .\self\NSDTA_bin.bin | [A-Z]{4}N[A-Z]{3}[LMIV] | CDQINKIII | 623 |
| .\self\NSDTA_bin.bin | [A-Z]{4}N[A-Z]{3}[LMIV] | NNNNNNNRI | 661 |
| .\self\NSDTA_bin.bin | [A-Z]{4}N[A-Z]{3}[LMIV] | NNNNNNNRI | 752 |
| .\self\NSDTA_bin.bin | [A-Z]{4}N[A-Z]{3}[LMIV] | PLKZNELKI | 825 |
| .\self\NSDTA_bin.bin | [A-Z]{4}N[A-Z]{3}[LMIV] | NNNNNNNNV | 858 |
| .\self\NSDTA_bin.bin | [A-Z]{4}N[A-Z]{3}[LMIV] | PLPZNZZRL | 882 |
| .\self\NSDTA_bin.bin | [A-Z]{4}N[A-Z]{3}[LMIV] | NEMZNMZFI | 1018 |
| .\self\NSDTA_bin.bin | [A-Z]{4}N[A-Z]{3}[LMIV] | RKSSNNNVI | 1114 |
| .\self\NSDTA_bin.bin | [A-Z]{4}N[A-Z]{3}[LMIV] | PKSSNNNVI | 1249 |
| .\self\NSDTA_bin.bin | [A-Z]{4}N[A-Z]{3}[LMIV] | VEQNNNNNV | 1340 |
| .\self\NSDTA_bin.bin | [A-Z]{4}N[A-Z]{3}[LMIV] | ZVWANNEZL | 1359 |
| .\self\NSDTA_bin.bin | [A-Z]{4}N[A-Z]{3}[LMIV] | LEMZNMZFI | 1397 |
| .\self\NSDTA_bin.bin | [A-Z]{4}N[A-Z]{3}[LMIV] | VLRVNRLZI | 1411 |
| .\self\NSDTA_bin.bin | [A-Z]{4}N[A-Z]{3}[LMIV] | ZVLANNEZL | 1539 |
| .\self\NSDTA_bin.bin | [A-Z]{4}N[A-Z]{3}[LMIV] | PRQRNVEYV | 1552 |
| .\self\NSDTA_bin.bin | [A-Z]{4}N[A-Z]{3}[LMIV] | PRKRNVEYV | 1617 |
| .\self\NSDTA_bin.bin | [A-Z]{4}N[A-Z]{3}[LMIV] | SSILNNKGM | 1629 |
| .\self\NSDTA_bin.bin | [A-Z]{4}N[A-Z]{3}[LMIV] | KSTNNTKKL | 1695 |
| .\self\NSDTA_bin.bin | [A-Z]{4}N[A-Z]{3}[LMIV] | RVVNNSNNI | 1735 |
| .\self\NSDTA_bin.bin | [A-Z]{4}N[A-Z]{3}[LMIV] | NNNNNNNHV | 1778 |
| .\self\NSDTA_bin.bin | [A-Z]{4}N[A-Z]{3}[LMIV] | IAGENKIII | 1898 |
| .\self\NSDTA_bin.bin | [A-Z]{4}N[A-Z]{3}[LMIV] | ZAVNNSNNI | 2091 |
| .\self\NSDTA_bin.bin | [A-Z]{4}N[A-Z]{3}[LMIV] | ZZRANRPVI | 2104 |
| .\self\NSDTA_bin.bin | [A-Z]{4}N[A-Z]{3}[LMIV] | IIRANRLRV | 2156 |
| .\self\NSDTA_bin.bin | [A-Z]{4}N[A-Z]{3}[LMIV] | QAFANNTLL | 2334 |
| .\self\NSDTA_bin.bin | [A-Z]{4}N[A-Z]{3}[LMIV] | ZKSRNEDPI | 2370 |
| .\self\NSDTA_bin.bin | [A-Z]{4}N[A-Z]{3}[LMIV] | NNNNNZTKV | 2409 |
| .\self\NSDTA_bin.bin | [A-Z]{4}N[A-Z]{3}[LMIV] | QIPANNNSI | 2430 |
| .\self\NSDTA_bin.bin | [A-Z]{4}N[A-Z]{3}[LMIV] | SMLNNKADV | 2548 |
| .\self\NSDTA_bin.bin | [A-Z]{4}N[A-Z]{3}[LMIV] | ZRPRNRKRL | 2585 |
| .\self\NSDTA_bin.bin | [A-Z]{4}N[A-Z]{3}[LMIV] | RKLKNRRII | 2786 |
| .\self\NSDTA_bin.bin | [A-Z]{4}N[A-Z]{3}[LMIV] | LSPNNTIKL | 2863 |
| .\self\NSDTA_bin.bin | [A-Z]{4}N[A-Z]{3}[LMIV] | SKIKNQRII | 2901 |
| .\self\NSDTA_bin.bin | [A-Z]{4}N[A-Z]{3}[LMIV] | SNIKNHLSI | 2981 |

METHOD OF AND APPARATUS FOR MONITORING CODE TO DETECT INTRUSION CODE

This application claims the benefit of Korean Patent Application No. 10-2005-0135839, filed on Dec. 30, 2005, in the Korean Intellectual Property Office, the disclosure of which is incorporated herein in its entirety by reference.

TECHNICAL FIELD

The present invention relates to a method of and apparatus for monitoring code to detect an intrusion code, and more particularly, to a method of and apparatus for monitoring application code executed in a computer to determine whether the application code is intrusion code or resident code.

BACKGROUND

Malicious code (malicious software, or malware) denotes all kinds of computer-executable code such as programs, macros, and scripts that are maliciously made to damage computer systems.

Figure 1:
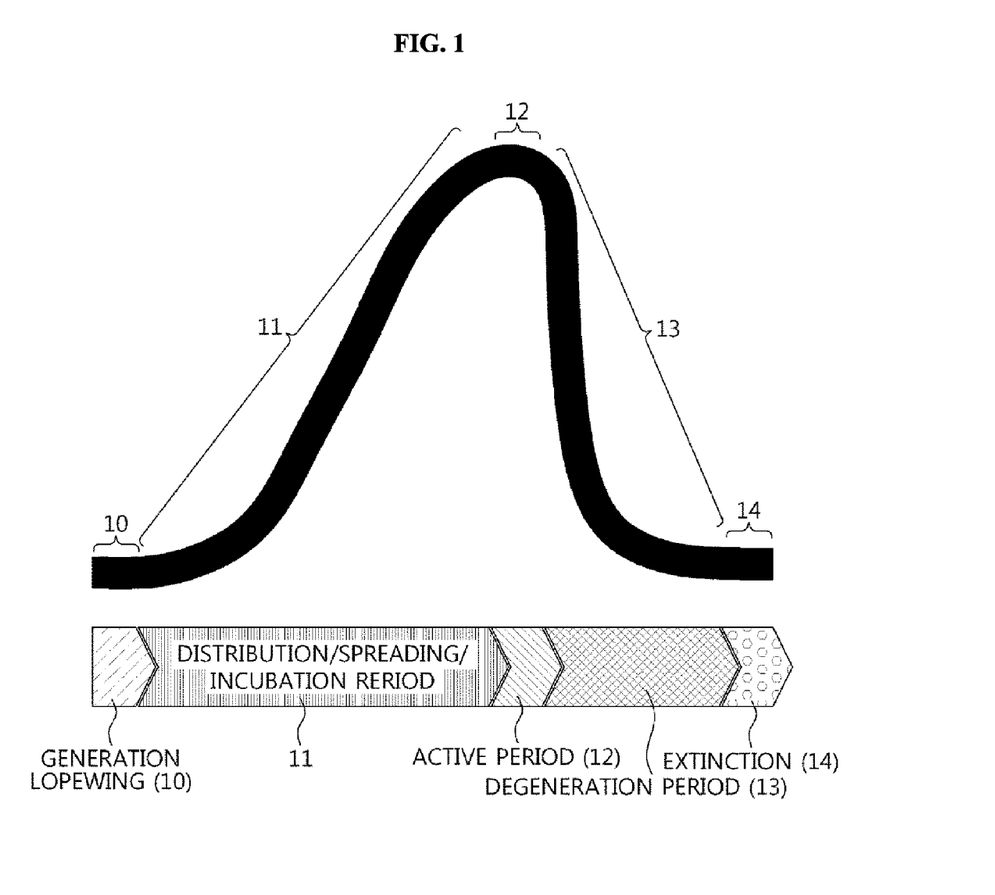
FIG. 1 shows the life cycle of a malicious code.

FIG. 1 shows the life cycle of a malicious code. Referring to FIG. 1, the life cycle of the malicious code includes a generation/opening period 10 in which the malicious code is generated and provided to the public, a distribution/spreading period 11 in which files infected with the malicious code are distributed and spread over a communication network, a recognition (active) period 12 in which the malicious code is active and a user recognizes the malicious code, a degeneration period 13 in which a vaccine program is updated and the malicious code is removed from a user's system, and an extinction period 14 in which the malicious code disappears.

Figure 2A:
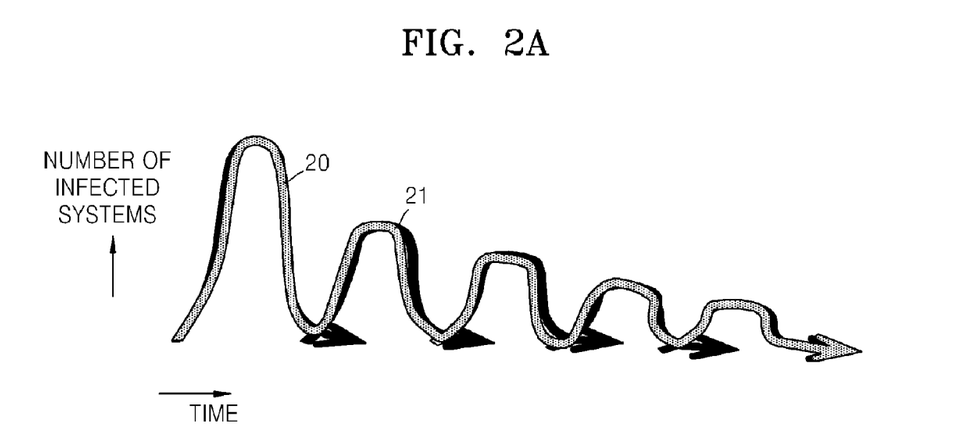
FIG. 2A shows the life cycle of a malicious code variant.

FIG. 2A shows the life cycle of a malicious code variant. In FIG. 2A, the horizontal axis denotes time, and the vertical axis denotes the number of infected systems. Referring to FIG. 2A, after new malicious code 20 appears and disappears, a variant 21 of the malicious code appears continuously, thereby increasing the life cycle of the malicious code.

Figure 2B:
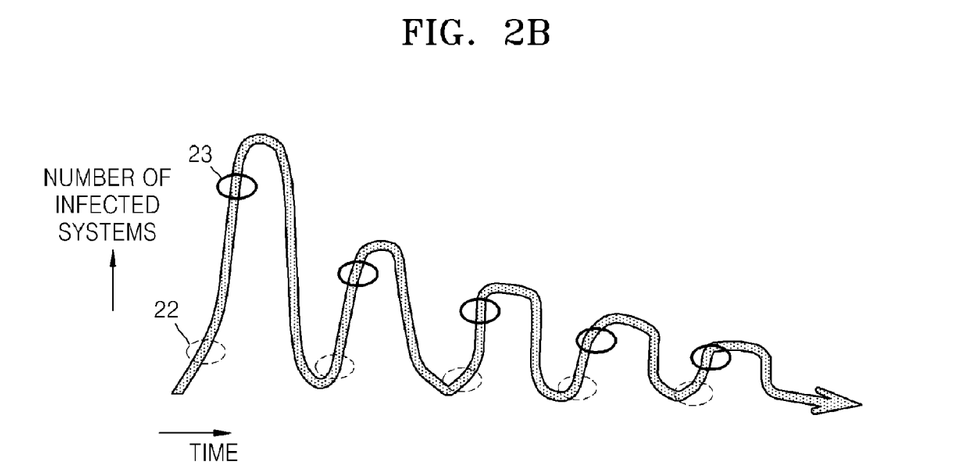
FIG. 2B shows points of time when action is taken against a malicious code.

FIG. 2B shows time points when action is taken against malicious code. Reference numeral 22 denotes a time point when a user thinks that a vaccine program should be updated in order to cope with the malicious code, and reference numeral 23 denotes a time point when the vaccine program is actually updated. Referring to FIG. 2B, there is a time difference between time points 22 and 23. The time difference is caused by time-consuming processes of analyzing the malicious code after the malicious code is already spread, drawing up a proper scheme and updating the vaccine program according to the scheme.

Further an appearance of malicious code variants causes an increase in time and effort to analyze the malicious code.

SUMMARY

The present invention provides a method of and apparatus for monitoring target code to determine whether the target code is an intrusion code or a resident code by extracting code pattern from the target code and comparing the extracted code pattern with code pattern reflecting the characteristics of the resident code.

According to an aspect of the present invention, a method of monitoring a target code to determine whether the target code is an intrusion code includes: extracting a first code pattern from the target code; loading a second code pattern from a storage unit; calculating the distance between the first code pattern and the second code pattern; and determining whether the target code is the intrusion code by comparing the calculated distance with a threshold.

According to another aspect of the present invention, an apparatus for monitoring a target code is used to determine whether the target code is an intrusion code intruding into a system. The apparatus includes a code pattern extracting unit and a code determining unit. The code pattern extracting unit extracts a first code pattern from the target code. The code determining unit determines whether the target code is the intrusion code by calculating a distance between the first code pattern and input second code pattern and comparing the calculated distance with a threshold.

According to a further aspect of the present invention, whether a target code is a resident code or an intrusion code is determined by using a mechanism of the self/non-self discrimination in a biological immune system, and thus the intrusion code determining efficiency can be improved. Accordingly, a vaccine program can be updated more rapidly and thus the malicious code can be treated more quickly.

DESCRIPTION OF DRAWINGS

The above and other features and advantages of the present invention will become more apparent by describing in detail exemplary embodiments thereof with reference to the attached drawings in which:

FIG. 5 shows an exemplified hexadecimal code loaded as a monitoring target code;

FIG. 6 shows an exemplified DNA code encoded from a hexadecimal code;

FIG. 7 shows a protein code replaced from the DNA code of FIG. 6 according to a codon rule;

FIG. 8 shows examples of code extracted from the protein code of FIG. 7 according to predetermined conditions;

DETAILED DESCRIPTION

The present invention will now be described more fully with reference to the accompanying drawings.

There is a DNA-based molecular computing technology employing DNA molecules in a field of molecular information processing technology that process information using bio-molecules. Basically the DNA-based molecular computing stores information to a DNA sequence and processes the information using chemical characteristics of a DNA molecule. Since cells forming the immune system can cope with a new antigen as well as memorize previously experienced antigens, various fields such as pattern recognition and feature extraction adopts the DNA-based molecular computing technology in order to use the characteristics of the immune system cells. The present invention uses the concept of DNA-based molecular computing technology to monitor code and determine whether the code is an intrusion code.

The core of the present invention is self/non-self classification inspired by the processes of biological immune system, where self and non-self are defined as normal and malicious codes, respectively. Similarly to that of the biological counterpart, the present embodiment realizes the self-learning mechanism that is capable of adapting itself to the unknown intrusion code. This means it can determine a specific code belongs to either self or non-self leading to a declaration of the latter as being potentially harmful.

Figure 3:
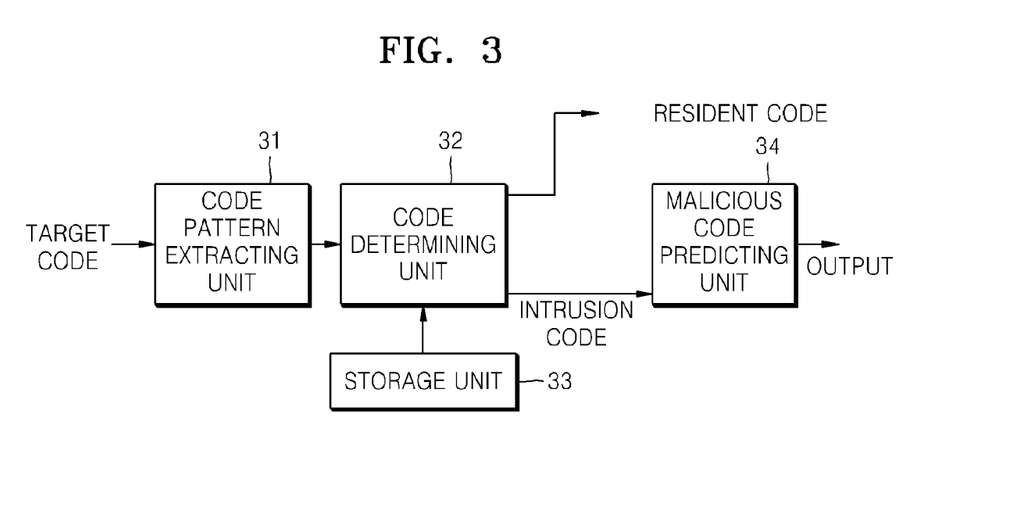
FIG. 3 is a block diagram of a code monitoring apparatus according to an embodiment of the present invention.

FIG. 3 is a block diagram of a code monitoring apparatus according to an embodiment of the present invention. The code monitoring apparatus includes a code pattern extracting unit 31 and a code determining unit 32. The code monitoring apparatus may further include a storage unit 33 storing immunity reference patterns for determining whether a target code is an intrusion code or a resident code. The code monitoring apparatus may further include a malicious code predicting unit 34. The malicious code predicting unit 34 predicts whether the intrusion code is a malicious code, when the code determining unit 32 determines that the target code is the intrusion code. The storage unit 33 can be a general data storage device such as a memory, an MD, a CD, and a DVD.

The code pattern extracting unit 31, first, extracts a code with a predetermined length to be used for the determination from the target code at a predetermined location. The code may be extracted from predetermined portions of the entire target code in a predetermined rate. For example, when the target code contains 1000 bytes, the code of 100 bytes may be extracted from the target code. In this case, the 100 byte code may be a set of 10 codes, each of which is of 10 bytes and extracted at different positions.

Further, the extracted code has uniqueness distinguished from other code extracted from other target codes. If the extracted code is not distinguished from the other codes, another code is extracted from the target code in the above-described way.

For a code pattern extraction, the present embodiment imitates an antigen presenting system, which monitors a portion of the antigen for an immune test in the biological immune system. That is, the antigen presenting system is applied to the target code for a code conversion and then code patterns are extracted on the converted code. In this embodiment, the code patterns are extracted from the target code by extracting protein codes from a DNA sequence and applying a self/non-self discrimination mechanism in the antigen presenting system to the extracted protein codes.

Figure 4:
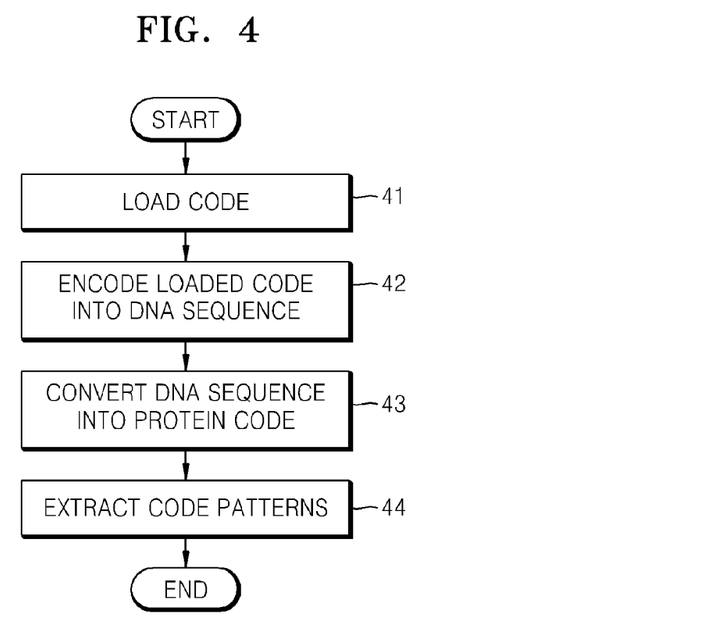
FIG. 4 is a flowchart of a code pattern extracting process in the code pattern extracting unit depicted in FIG. 3.

FIG. 4 is a flowchart of a code pattern extracting process of the code pattern extracting unit 31 employing the concept of the biological immune system.

In operation 41, a path of an execution code is tracked and the entire execution code is loaded. The execution code may be loaded in one of the following time points when: a file is copied to a computer system, a file is transmitted through an email etc., over a network, a user runs an execution file, and a user sets with respect to an anti-malicious code program. FIG. 5 shows an exemplified hexadecimal code 52 of the loaded code. Reference numeral 51 denotes the location of the hexadecimal code 52.

In operation 42, the loaded code is encoded into DNA code. The encoding is performed by dividing the value of each byte of the hexadecimal code shown in FIG. 5 by 4, and replacing the remainder 0, 1, 2, or 3 thereof with DNA bases, A, T, G, or C, respectively. An example of the encoding result is shown in FIG. 6.

In operation 43, the DNA code is converted into a protein code. The conversion is performed according to a well-known human codon rule. The human codon rule is shown in Table 1 below.

TABLE 1

| Amino acid | Substitution value | Codon |
|---|---|---|
| Alanine | A | GCA, GCC, GCG, GCT |
| Cysteine | C | TGC, TGT |
| Aspartic acid | D | GAC, GAT |
| Glutaminc acid | E | GAA, GAG |
| Phenylalanine | F | TTC, TTT |
| Glycine | G | GGA, GGC, GGG, GGT |
| Histidine | H | CAC, CAT |
| Isoleucine | I | ATA, ATC, ATT |
| Lysine | K | AAA, AAG |
| Leucine | L | TTA, TTG, CTA, CTC, CTG, CTT |
| Methionine | M | ATG |
| Asparagine | N | AAC, AAT |
| Proline | P | CCA, CCC, CCG, CCT |
| Glutamine | Q | CAA, CAG |
| Arginine | R | CGA, CGC, CGG, CGT |
| Serine | S | TCA, TCC, TCG, TCT, AGC, AGT |
| Threonine | T | ACA, ACC, ACG, ACT |
| Valine | V | GTA, GTC, GTG, GTT |
| Tryptophan | W | TGG |
| Tyrosine | Y | TAT |
| Stop Codons | Z | TAA, TAG, TGA |

Referring to Table 1, for example, codon GCA of the DNA code is replaced with "A." FIG. 7 shows the substitution result for the DNA code of FIG. 6 obtained using Table 1.

In operation 44, the code pattern is extracted from the protein code shown in FIG. 7. The code pattern is obtained by extracting a portion corresponding to a binding pattern of a Major Histocompatibility Complex 1 (MHC1) molecule, a mechanism used for self/non-self discrimination in the biological immune system, from the protein code.

The MHC1 molecule binding pattern can be expressed by the following two formulas.

$$[A\text{-}Z]\{2\}Y[A\text{-}Z][YF][A\text{-}Z]\{2\}[LMIV] \quad (a)$$

$$[A\text{-}Z]\{4\}N[A\text{-}Z]\{3\}[LMIV] \quad (b)$$

where [A-Z] denotes a selectable range from A to Z, and {2} denotes the number of successive letters.

FIG. 8 shows examples extracted from the protein code of FIG. 7 according to one of the two equations. Referring to FIG. 8, reference numerals 81, 82, 83, and 84 denote file names, patterns satisfying equation (a) or (b), protein codes obtained using equation (a) or (b), and locations of the protein codes 83 in a file, respectively.

The code determining unit 32 shown in FIG. 3 loads a reference code pattern stored in the storage unit 33 and compares the loaded reference code pattern with the code pattern extracted by the code pattern extracting unit 31 to determine whether the extracted code is a resident code or an intrusion code.

Here, the reference code pattern is previously determined to be the reference code pattern of immunity using a resident code by the code pattern extracting unit 31 and by the code determining unit 32, and then stored in the storage unit 33.

Figure 9:
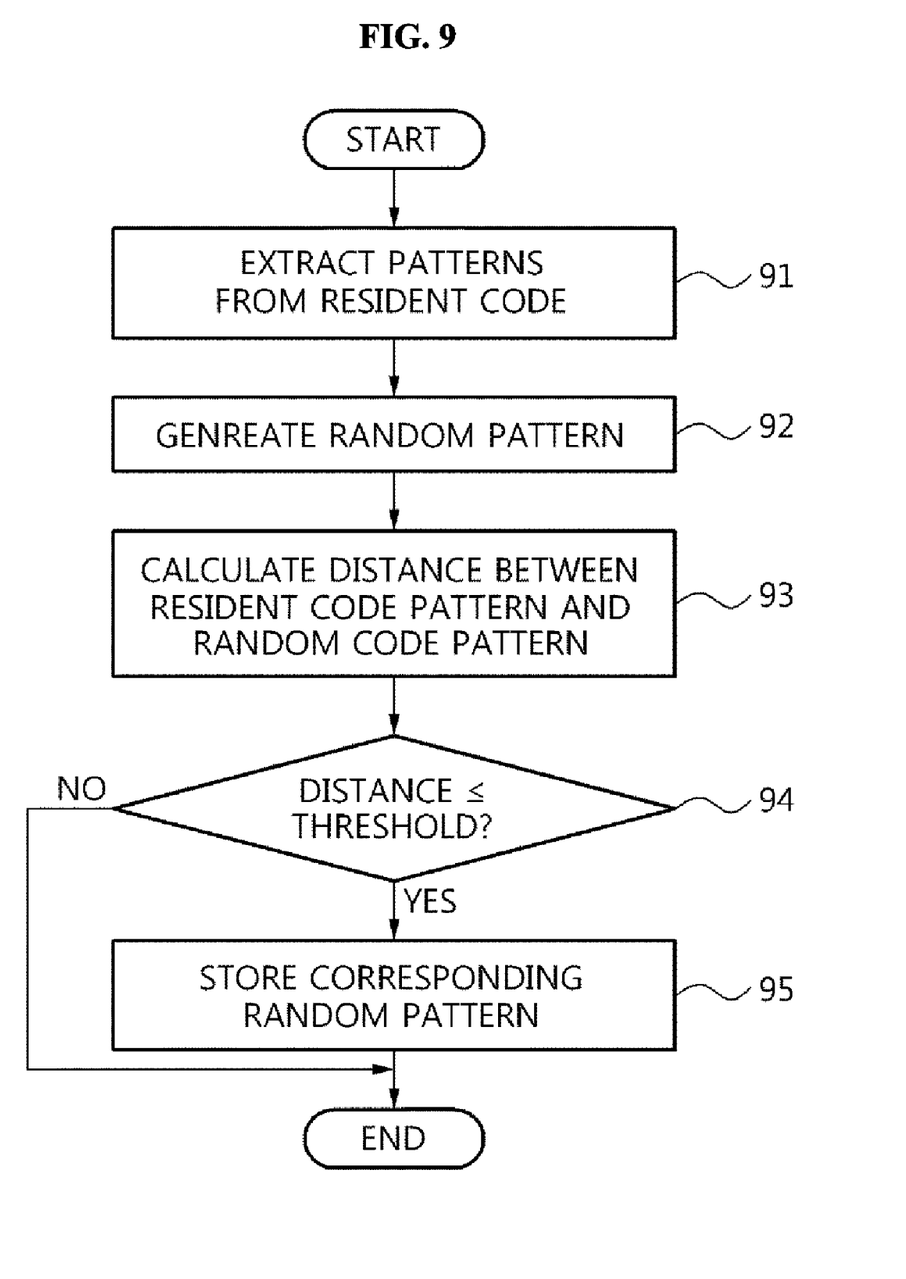
FIG. 9 is a flowchart showing a process of storing a reference code pattern in a storage unit depicted in FIG. 3.

FIG. 9 is a flowchart of a process of storing immunity reference patterns in the storage unit 33. In operation 91, a code pattern is extracted from a resident code. The extraction of the patterns is performed according to the process shown in FIG. 4.

In operation 92, a random pattern is created. The random pattern is randomly generated to have the same length as the pattern extracted from the resident code. In operation 93, the distance between the resident code pattern and i-th random pattern is calculated. The distance may be calculated using various methods. For example, as shown in Equation 1 below, the distance may be calculated by squaring differences in alphabetic order and adding all the squared values.

$$dist_i(S, T) = \sum_{j=1}^{N} \sum_{k=1}^{n} (s_{jk} - t_{ik})^2 \quad \text{Equation 1}$$

where S, T, N, and n denote the resident code patterns, the random patterns, the number of the resident code patterns, and the pattern length, respectively.

In operation 94, the distance calculated using Equation 1 with respect to the i-th random pattern is compared with a second threshold. If the distance is equal to or less than the second threshold, the i-th random pattern is stored in the storing unit 33 as a reference code pattern in operation 95.

The second threshold is a predetermined value and its minimum value is selected to be a half of the distance between two code patterns selected arbitrarily from the resident code pattern distribution. The higher the threshold is set, the more the reference code patterns, while the lower the threshold is set, the fewer the reference code patterns.

The code determining unit 32 calculates the distance between the reference code pattern stored in the storage unit 33 and the pattern extracted from the target code by the code pattern extracting unit 31 according to the process shown in FIG. 9 as in the following Equation.

$$dist(S, T) = \sum_{i=1}^{N} \sum_{j=1}^{M} \sum_{k=1}^{n} (s_{jk} - t_{ik})^2 \quad \text{Equation 2}$$

where S, T, N, M, and n denote the reference code patterns, the patterns extracted from the target code, the number of the reference code patterns, the number of the patterns extracted from the target code, and a length of the patterns of the reference code and target code, respectively.

If the distance calculated using Equation 2 is less than or equal to a first threshold, it is determined that the target code is a resident code. If the distance is greater than the first threshold, it is determined that the target code is an intrusion code.

If the code determining unit 32 determines that the target code is the intrusion code, the malicious code predicting unit 34 determines whether the intrusion code is a malicious code. The determination by the malicious code predicting unit 34 is performed based on user's experiences and the suspected malicious code. General symptoms of the malicious code can be detected from file characteristics, goat file tests, changes in processes, threads, and registries, network ports, code emulation, execution code debugging or system monitoring, etc. The symptoms of the malicious code may vary according to the type of the malicious code, such as spyware, a worm, a bot, a trojan, a file virus, and a macro virus, and whether the malicious code is compressed.

The determination of the malicious code may be patternized or automated based on a user's experiences. When the intrusion code is determined as a malicious code, the malicious code predicting unit 34 may stop the execution of the corresponding code or other codes and generate an alarm to other computers over a network.

Table 2 illustrates experimental results that the target code is determined to be the intrusion code according to the first thresholds and the reference code pattern generation rates.

TABLE 2

| | Threshold | | | | | | | | |
|---|---|---|---|---|---|---|---|---|---|
| | 3500 | 3300 | 3100 | 2900 | 2700 | 2500 | 2300 | 2100 | 1900 |
| Rate | | | | | 1.E−06 | | | | |
| #1 | 0% | 25% | 37.5% | 37.5% | 50% | 50% | 50% | 62.5% | 37.5% |
| #2 | 12.5% | 12.5% | 37.5% | 37.5% | 50% | 50% | 50% | 50% | 50% |
| Rate | | | | | 5.E−06 | | | | |
| #1 | 12.5% | 37.5% | 50% | 50% | 62.5% | 62.5% | 62.5% | 62.5% | 50% |
| #2 | 12.5% | 12.5% | 50% | 62.5% | 50% | 62.5% | 62.5% | 62.5% | 50% |
| Rate | | | | | 1.E−05 | | | | |
| #1 | 12.5% | 37.5% | 50% | 62.5% | 62.5% | 87.5% | 62.5% | 50% | 62.5% |
| #2 | 12.5% | 25% | 50% | 62.5% | 62.5% | 62.5% | 62.5% | 75% | 62.5% |

Referring to Table 2, the rate denotes the reference code pattern generation rate, namely, a rate of the number of actually generated reference code patterns with respect to the number of all of the possibly generated reference code patterns. For example, if the length of the pattern is n, and the number of letters used for the pattern is m, the number of all of the possibly generated pattern will be $m^n$. The generation rate means that, for example, $1/10$, $1/100$ . . . of $m^n$ the possible patterns are actually generated as the reference code patterns. In Table 2, the intrusion code determination performance is measured using the numbers of reference code patterns corresponding to the reference code generation rate of 1/1,000,000, 5/1,000,000, and 1/100,000, respectively.

According to Table 2, when the first thresholds are 2700, 2500, and 2300, the intrusion code determination performance is high. Further, as the reference code generation rate increases, the intrusion code determination efficiency becomes high.

To evaluate the intrusion code determination performance of the present invention, another experiment was performed on malicious code samples evading conventional vaccine programs.

Among 48,471 malicious code samples, 17,885 malicious code samples were detected by a conventional vaccine program, and 30,506 malicious code samples evaded the conventional vaccine program. For malicious codes determined to be the intrusion code according to the self/non-self discrimination on 2,575 malicious code samples randomly selected from the 30,506 evasive malicious code samples, the present invention shows 48% and 68% determination rates when the first threshold is set to 2700 and the reference code pattern generation rate is set to 1.E−06 and 1.E−05, respectively. Consequently, the present invention detects evasive malicious code samples as intrusion codes that are potentially harmful to the systems.

Figure 10:
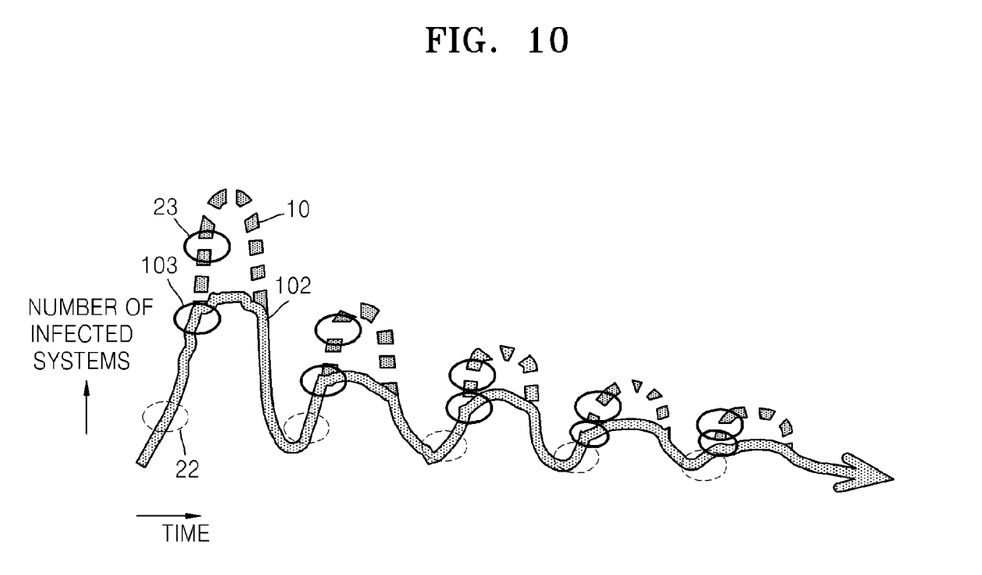
FIG. 10 shows life cycles of a malicious code variant when code pattern extracting methods of the conventional art and an embodiment of the present invention are used.

FIG. 10 shows the life cycles of a malicious code variant according to the conventional art and the present invention. Reference numeral 10 denotes the life cycle of the malicious code variant according to the conventional art, and reference numeral 102 denotes the life cycle of the malicious code variant according to the present invention. Reference numeral 22 denotes a time point when a user thinks that a vaccine program should be updated for curing the malicious code, and reference numeral 23 denotes a time point when the vaccine program is actually updated according to the conventional art. Reference numeral 103 denotes a time point when the vaccine program is actually updated according to the present invention. Referring to FIG. 10, the malicious code can be reported to a vaccine program distributor more rapidly in the present invention than in the conventional art by determining whether a target code is an intrusion code and predicting whether the intrusion code is a malicious code. Therefore, the vaccine program can be updated more quickly.

In addition to the above-described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code.

The computer readable code/instructions can be recorded/transferred in/on a medium in a variety of ways, with examples of the medium including magnetic storage media (e.g., ROM, floppy disks, hard disks, etc.), optical recording media (e.g., CD-ROMs, or DVDs), random access memory media, and storage/transmission media such as carrier waves. Examples of storage/transmission media may include wired or wireless transmission (such as transmission through the Internet). The medium may also be a distributed network, so that the computer readable code/instructions is stored/transferred and executed in a distributed fashion. The computer readable code/instructions may be executed by one or more processors.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of monitoring a target code to determine whether the target code is an intrusion code to a system or a resident code in the system, the method comprising:
   extracting a first code pattern from the target code;
   loading a second code pattern from a storage unit;
   calculating a distance between the first code pattern and the second code pattern; and
   determining whether the target code is the intrusion code by comparing the calculated distance with a first threshold, wherein the extracting of the first code pattern comprises:
      encoding the target code into a DNA base sequence;
      replacing the DNA base sequence with a corresponding protein value; and
      extracting the first code pattern satisfying a predetermined condition from the generated sequence according to the replacement.

2. The method of claim 1, wherein the first code pattern is extracted from a pre-determined portion of the target code, with respect to each target code, and the extracted first code pattern is unique.

3. The method of claim 1, wherein an antigen-presenting system for biological immunity determination is applied to the target code for code conversion and a portion having the predetermined pattern is extracted from the converted code.

4. The method of claim 1, wherein the encoding of the target code comprises:
   performing modulo operations on the target code in a byte unit by a number of DNA bases; and
   replacing each remainder obtained through the modulo operation with one of the DNA bases.

5. The method of claim 1, wherein the replacing of the DNA base sequence comprises replacing three consecutive bases of the DNA sequence with a value corresponding to the protein according to a codon rule.

6. The method of claim 1, wherein the first code pattern extracted from the replaced value satisfies one of binding pattern conditions of a MHC 1 (Major histocompatibility complex 1) molecule.

7. The method of claim 1, wherein the loading of the second code pattern comprises:
   extracting a third code pattern from a resident code;
   producing a random pattern having a same length as the third code pattern;
   calculating a second distance between the produced random pattern and the third code pattern; and
   storing the random pattern whose second distance is less than a second threshold in the storage unit as the second code pattern.

8. The method of claim 7, wherein the third code pattern is extracted in a predetermined length from the resident code at a predetermined location.

9. The method of claim 7, wherein an antigen presenting system for biological immunity determination is applied to the resident code for code conversion and a portion having a predetermined pattern is extracted as the third code pattern from the converted code.

10. The method of claim 7, wherein the extracting of the third code pattern comprises:
    encoding the resident code into a DNA base sequence;
    replacing the DNA base sequence with a corresponding protein value; and
    extracting the third code pattern satisfying a predetermined condition from the replaced value.

11. The method of claim 10, wherein the encoding of the resident code comprises:
    performing modulo operations on the resident code in a byte unit by a number of DNA bases; and
    replacing each remainder obtained through the modulo operation with one of the DNA bases.

12. The method of claim 10, wherein the replacing of the DNA sequence comprises replacing three consecutive bases of the DNA sequence with a value corresponding to the protein according to a codon rule.

13. The method of claim 10, wherein the third code pattern extracted from the replaced value satisfies one of binding pattern conditions of a MHC1 molecule.

14. The method of claim 7, wherein the second threshold has a minimum value of a half of a distance between two code patterns selected from a code pattern distribution of the resident code.

15. The method of claim 7, wherein each of the second distance is calculated as a sum of squares of differences of an alphabetical order between each random pattern and the third code pattern.

16. The method of claim 1, wherein the distance is calculated as a sum of squares of differences of an alphabetical order between the first code pattern and the second code pattern.

17. The method of claim 1, further comprising:
determining the target code is a malicious code if the target code is determined to be the intrusion code.

18. An apparatus for monitoring a target code to determine whether the target code is an intrusion code to a system or a resident code in the system, the apparatus comprising:
a code pattern extracting unit arranged to extract a first code pattern from the target code; and
a code determining unit arranged to determine whether the target code is the intrusion code by calculating a distance between the first code pattern and an input second code pattern and comparing the calculated distance with a first threshold,
wherein the code pattern extracting unit applies an antigen-presenting system for biological immunity determination to the target code for code conversion and extracts a portion having a predetermined pattern as the first code pattern from the converted code, and
wherein the code pattern extracting unit extracts the first code pattern by encoding the target code into a DNA base sequence, replacing the DNA base sequence with a corresponding protein to form a protein array and extracting the first code pattern satisfying a predetermined condition from the generated sequence according to the replacement.

19. The apparatus of claim 18, wherein the code pattern extracting unit extracts the first code pattern being unique to the target code from a predetermined portion of the target code.

20. The apparatus of claim 18, wherein the predetermined condition is any one of a binding pattern conditions of a MHC1 molecule.

21. The apparatus of claim 18, further comprising a storage unit storing the second code pattern,
wherein
the code pattern extracting unit extracts a third code pattern from the resident code and generates a random pattern having a same length as the third code pattern, and
the code determining unit calculates each second distance between the produced random pattern and the extracted third code pattern and stores a corresponding random pattern in the storage unit as the second code pattern if each of the second distances is less than a second threshold.

22. The apparatus of claim 18, further comprising a malicious code predicting unit arranged to determine whether the target code is malicious if the code determining unit determines that the target code is the intrusion code.

23. A method of extracting a code pattern to monitor a target code to determine whether the target code is an intrusion code to a system or a resident code in the system, the method comprising:
extracting a code pattern from the resident code;
producing a random pattern corresponding to the extracted code pattern;
calculating a distance between the random pattern and the code pattern; and
extracting a corresponding random pattern as a code pattern for biological immunity determination if the calculated distance is less than a threshold value, wherein the extracting of the code pattern comprises:
encoding the resident code into a DNA base sequence;
replacing the encoded DNA base sequence with a corresponding protein value; and
extracting a pattern satisfying a predetermined condition as the code pattern.

24. The method of claim 23, wherein the extracting of the code pattern applies an antigen-presenting system for biological immunity determination to the resident code for code conversion and extracts a portion having a predetermined pattern from the converted code.

25. The method of claim 23, wherein the encoding of the resident code into the DNA base sequence comprises:
performing modulo operations on a number of DNA bases in a byte unit; and
replacing each remainder obtained through the modulo operation with one of the DNA bases.

26. The method of claim 23, wherein the replacing of the encoded DNA base sequence with the corresponding protein value replaces three consecutive DNA bases of the DNA base sequence with a value corresponding to the protein according to a codon rule.

27. The method of claim 23, wherein the extracting of the pattern satisfying the predetermined condition as the code pattern extracts a pattern satisfying any one of a binding pattern conditions of a MHC1 molecule.

28. An apparatus that extracts a code pattern to monitor a target code to determine whether the target code is an instruction code to a system or a resident code in the system, the apparatus comprising:
a code pattern extracting unit extracting a code pattern from the resident code;
a random pattern producing unit producing a random pattern corresponding to the extracted code pattern having a same length as the extracted code pattern;
a distance calculating unit calculating a distance between the produced random pattern and the extracted code pattern; and
a code pattern storage unit storing a corresponding random pattern as a code pattern for biological immunity determination if the calculated distance is less than a threshold value, wherein the code pattern extracting unit comprises:
encoding the resident code into a DNA base sequence;
replacing the encoded DNA base sequence with a corresponding protein value; and
extracting a pattern satisfying a predetermined condition as the code pattern.

* * * * *